(12) United States Patent
Laurenczy et al.

(10) Patent No.: US 8,133,464 B2
(45) Date of Patent: Mar. 13, 2012

(54) HYDROGEN PRODUCTION FROM FORMIC ACID

(75) Inventors: Gabor Laurenczy, Lonay (CH); Céline Fellay, Lausanne (CH); Paul Dyson, Ecublens (CH)

(73) Assignee: Ecole Polytechnique Federale de Lausanne (EPFL), Lausanne (CH)

( * ) Notice: Subject to any disclaimer, the term of this patent is extended or adjusted under 35 U.S.C. 154(b) by 319 days.

(21) Appl. No.: 12/311,954

(22) PCT Filed: Oct. 17, 2007

(86) PCT No.: PCT/IB2007/054222
§ 371 (c)(1),
(2), (4) Date: Apr. 29, 2009

(87) PCT Pub. No.: WO2008/047312
PCT Pub. Date: Apr. 24, 2008

(65) Prior Publication Data
US 2010/0068131 A1 Mar. 18, 2010

(30) Foreign Application Priority Data
Oct. 18, 2006 (EP) .................................... 06122534

(51) Int. Cl.
*C01B 31/20* (2006.01)
*C01B 3/22* (2006.01)
(52) U.S. Cl. ................... 423/437.1; 423/648.1
(58) Field of Classification Search ............... 423/437.1, 423/648.1
See application file for complete search history.

(56) References Cited

U.S. PATENT DOCUMENTS

| 4,160,816 | A  | * | 7/1979  | Williams et al. ........... 423/648.1 |
| 4,597,363 | A  |   | 7/1986  | Emelock |
| 5,606,107 | A  | * | 2/1997  | Smith ............................. 562/17 |
| 7,829,051 | B2 | * | 11/2010 | Fridman et al. ............ 423/415.1 |
| 2003/0185749 | A1 | * | 10/2003 | Mahajan .................... 423/648.1 |
| 2004/0022716 | A1 | * | 2/2004  | Mahajan .................... 423/418.2 |
| 2008/0219918 | A1 | * | 9/2008  | Lee et al. ................... 423/648.1 |

FOREIGN PATENT DOCUMENTS

FR 1 228 452 A 8/1960
JP 2005-289742 10/2005

OTHER PUBLICATIONS

Jenner G., et al., Formaldehyde and formates as sources of synthesis gas via ruthenium-catalyzed decomposition reactions; Journal of Molecular Catalysis, vol. 64, No. 3, 1991, pp. 337-347, XP002426818 p. 340, line 30-line 42.

(Continued)

*Primary Examiner* — Wayne Langel
(74) *Attorney, Agent, or Firm* — Clifford W. Browning; Krieg DeVault LLP

(57) ABSTRACT

The present invention relates to a method of producing hydrogen gas and carbon dioxide in a catalytic reaction from formic acid, said reaction being conducted in an aqueous solution over a wide temperature range and already at room temperature (25° C.). The reaction is advantageous because it can be tuned to take place at very high rates, up to about 90 liter H2/minute/liter reactor volume. The gas produced is free of carbon monoxide. The method of the present invention is particularly suitable for providing hydrogen for a motor, fuel cell or chemical synthesis.

19 Claims, 6 Drawing Sheets

OTHER PUBLICATIONS

Laine, R.M., et al., Homogeneous catalysis by ruthenium carbonyl in alkaline solution: the water gas shift reaction; Journal of American Chemical Society, vol. 99, No. 1, Jan. 5, 1977, pp. 252-253, XP002426812 p. 252, left-hald col. line 65- right hand col. line 3 p. 252, right-hand col. line 63—p. 253, left-hand col. line 8.

Khai, B.T., et al., RuC12 (PPh3) 3/HCOOH/Et3N as a new hydrogen source. Selective reduction of aromatic nitro, Journal of Organometallic Chemistry, vol. 309, 1986, pp. C63-C66, XP002426813 p. C63, line 1-line 4.

King, R.B., et al., Catalytic reactions of formate 4. A nitrite-promoted rhodium (III) catalyst for hydrogen generation from formic acid in aqueous solution, Inorganica Chimica Acta, X, XX, vol. 237, No. 1-2, Sep. 1995, pp. 65-69, XP004818481 ISSN. 0020-1693, the whole document.

Joszai, I., et al., Hydrogenation of aqueous mixtures of calcium carbonate and carbon dioxide using a water-soluble rhodium (I)-tertiary phosphine complex catalyst, Journal of Molecular Catalysis A. Chemical, vol. 224, 2004, pp. 87-91, XP002426815 cited in the application p. 90, left-hand col. line 25, right-hand col. line 8; figure 5.

Gao, Y., et al., The interconversion of formic acid and hydrogen/carbon dioxide using a binuclear ruthenium complex catalyst; J. Chem. Soc., Dalton Trans., 2000 pp. 3131-3217, XP002426814, the whole document.

\* cited by examiner

HYDROGEN PRODUCTION FROM FORMIC ACID

This application claims the benefits under 35 U.S.C. 119 (a)-(d) or (b), or 365(b) of International Application No. PCT/IB2007/054222 filed Oct. 17, 2007, and Swiss Patent Application No. 06122534.8 filed Oct. 18, 2006.

TECHNICAL FIELD

The present invention relates to a method of producing hydrogen gas and carbon dioxide from formic acid, and to a method of producing energy.

PRIOR ART AND THE PROBLEM UNDERLYING THE INVENTION

Hydrogen gas, $H_2$, is a versatile source of energy and an important starting material for many chemical reactions. Therefore, hydrogen production is a large and growing industry, with globally about 50 million tons being produced in 2004. As an energy source, for example, it can be used in fuel cells, combustion motors and chemical reactors for producing energy in the form of electric energy, kinetic energy, and/or heat, just to mention a few. It is for these many applications that hydrogen gas was recognised to be a primary carrier that connects a host of energy sources to diverse end uses (US Department of Energy 2003 report).

The high importance of hydrogen gas may be illustrated at the example of the hydrogen fuel cell. Although water electrolysis gives very pure $H_2$, traditionally produced hydrogen gas often contains carbon monoxide, which is deleterious to the catalyst in fuel cells. This indicates how important it is to provide a process for producing hydrogen gas at high purity locally, comprising no contamination by CO.

Furthermore, hydrogen gas is extremely volatile. As a consequence, hydrogen gas is stored at high pressure or low temperature in gas containers made of steel, the weight of which is exceeding by far the weight of the hydrogen gas stored in it.

Hydrogen gas reacts violently with oxygen in a wide concentration range, making the storage of large quantities of hydrogen dangerous.

Given the difficulty in storing the volatile hydrogen gas, it is a particular objective to provide a process of preparing hydrogen gas in situ, in other words, instantly upon demand of a selected, hydrogen consuming device or process. For example, it would be advantageous to provide a vehicle comprising a hydrogen fuel cell or a hydrogen driven combustion motor, the vehicle being propelled by energy generated in a reaction consuming hydrogen gas. Preferably, such a vehicle does not require a heavy and dangerous container for storage of hydrogen gas.

Generally, the present invention seeks to provide hydrogen gas in an inexpensive, efficient manner, and, if necessary at high pressure, in suitable reactors for direct use in a hydrogen consuming process or device.

In JP 2005-289742 a method for producing hydrogen gas and carbon dioxide from formic acid is disclosed. However, the reaction is conducted at temperatures in the range of 250-600° C. and is, therefore, not very practical.

U.S. Pat. No. 4,597,363 disclose a method of producing hydrogen gas for a fuel cell by conversion of oxalic acid to formic acid, followed by formation of hydrogen gas and carbon dioxide from formic acid at elevated temperatures.

In both prior art documents, hydrogen gas is obtained at a low conversion rate, relatively high temperatures and at a low gas pressure. It is an objective of the present invention, to provide a method for producing hydrogen gas at higher reaction rates, temperatures in the range of 30-180° C. and at desired/very high gas pressures.

Istvan Jószai and Ferenc Joó "Hydrogenation of aqueous mixtures of calcium carbonate and carbon dioxide using a water-soluble rhodium(I)-tertiary phosphine complex catalyst" Journal of Molecular Catalysis A: Chemical 224 (2004) 87-91, disclose a method in which calcium formate is obtained from calcium carbonate under a gas phase containing both $H_2$ and $CO_2$. Also the decomposition of $Ca(HCOO)_2$ to $H_2$ and $CO_2$ by aid of the same catalyst was reported. Again, only low conversion rates and low gas pressures were obtained.

Jenner et al, Journal of Molecular Catalysis, 64 (1991) 337-347, disclose the decomposition of formic acid, more precisely methyl formate in aqueous solution, to hydrogen, carbon dioxide and carbon monoxide (1%). In this reaction, CO is produced in an intermediate step, which accounts for its presence in the final products. As catalysts, $Ru_3(CO)_{12}$ and tributylphosphine are disclosed. Furthermore, no formate salt is added to the reaction mixture. In view of this document, it is an objective of the present invention to avoid CO impurities on the product side, use formic acid as $H_2$ and $CO_2$ source, avoid the formation of methanol as by-product and to be able to conduct the reaction at lower temperatures with still high conversion efficiency and speed.

R. Laine et al., Journal of American Chemical Society, 99(1) (1977) p. 252-253, disclose the use of a ruthenium carbonyl catalyst in a water gas shift reaction conducted in very diluted ethoxyethanol solvent. A relatively slow conversion of formic acid or formate to hydrogen gas and $CO_2$ in the same system is reported (half life of formic acid is about 300 s). The very diluted ethoxyethanol solution, with a molar ratio of KOH/HCOOH higher than 1.5 (mole/mole), renders this reaction unsuitable for practical applications.

Khai et al., Journal of organometallic chemistry, 309 (1986) p. C63-C66 disclose the reduction of nitro- and halo aromatic compounds in presence of formic acid, the latter being decomposed in the course of the reaction. The reaction takes place in organic solvents (THF, benzene, DMF) and in presence of a water-insoluble triphenyl ruthenium catalyst. The reduction of nitro- and halo aromatic compounds is not the subject of the present invention.

King et al., Inorganica Chimica Acta, 237 (1-2) (1995), p. 65-69, report the decomposition of formic acid in a system comprising a aqueous solution of rhodium(III) and $NO^{2-}$. In this reaction, $NO^{2-}$ is used up and converted to $N_2O$. The catalyst is quickly deactivated during the reaction into insoluble Rh metal. The present invention has the goal of converting formic acid to hydrogen in a continuous way with catalyst recycling. Furthermore, specific further products are not desired.

Gao et al., J. Chem. Soc., (2000), p. 3212-3217 and Chem. Comm. (1998), 2365-2366, disclose the interconversion of formic acid and $H_2/CO_2$ in acetone solution in presence of a binuclear ruthenium catalyst comprising two bis-(diphenylphosphine)methane ligands. They use air/oxygen sensitive system and catalyst, which releases CO during the activation. Acetone is a volatile and flammable solvent.

FR 1228452 discloses the decomposition of formic acid in mixtures comprising further aliphatic acids by the aid of a catalyst comprising a metal such as platine bound on active carbon. The reaction takes place slowly and conversion efficiencies are around 80-90%). The present invention has the objective of conducting the conversion of formic acid in absence of other aliphatic acids and at higher conversion efficiencies.

It is an objective of the present invention to provide a method of producing hydrogen gas at a increased rate and at a high conversion efficiency. It is a further objective to produce hydrogen gas at higher pressures. Ideally, hydrogen gas is produced at desired $H_2$ partial pressures of up to 600 bar or more.

In particular, it is an objective to produce hydrogen in situ, at a desired high rate for feeding a hydrogen consuming device, for example a fuel cell or burning motor, or a hydrogen consuming process directly, in an amount corresponding to the hydrogen gas to be used.

SUMMARY OF INVENTION

The inventors of the present invention provided a method for producing hydrogen gas from formic acid, which method meets the objectives discussed above and which solves the problems of the prior art.

In a first aspect, the present invention provides a method of producing hydrogen gas and carbon dioxide in a chemical reaction from formic acid, said reaction being conducted at a temperature in the range of 20-200° C.

In a second aspect, the present invention provides a method of producing hydrogen gas and carbon dioxide in a chemical reaction from formic acid, said reaction being conducted in an aqueous medium. Preferably, the reaction is conducted at a pH in the range of 0-7, 1.5-5, more preferably 2.5-4.5.

In a third aspect, the present invention provides a method of producing hydrogen gas and carbon dioxide in a chemical reaction from formic acid, said reaction being conducted at a total gas pressure in the range of 1-1200 bar, or higher.

In a fourth aspect, the present invention provides a method of producing hydrogen gas and carbon dioxide in a chemical reaction from formic acid, said reaction being conducted at a $H_2$ partial pressure in the range of 0.5-600 bar, or higher.

In a fifth aspect, the present invention provides a method of producing hydrogen gas and carbon dioxide in a chemical reaction from formic acid, said reaction being conducted in presence of a formate salt.

In a sixth aspect, the present invention provides a method of producing hydrogen gas and carbon dioxide in a chemical reaction from formic acid, said reaction being conducted in presence of a catalyst, said catalyst preferably being a complex of the general formula (I):

$$M(L)_n \qquad (I)$$

in which,
M is a metal selected from Ru, Rh, Ir, Pt, Pd, and Os, preferably Ru;
L is a ligand comprising at least one phosphorus atom or carbenes, said phosphorus atom being bound by a complex bond to said metal, L further comprising at least an aromatic group and a hydrophilic group; and,
n is in the range of 1-4;

wherein the complex of formula (I) optionally comprises other ligands and is provided in the form of a salt or is neutral.

In a seventh aspect, the present invention provides a method for producing hydrogen gas at controlled quantity and/or gas pressure comprising the reaction according to the present invention.

In an eight aspect, the present invention provides a method for producing hydrogen for a hydrogen consuming process and/or device, the method comprising the steps of:

producing hydrogen gas according to the method of the invention, and,
directing the hydrogen gas to the hydrogen consuming process and/or device.

In a ninth aspect, the present invention provides a method producing energy, the method comprising the steps of:
producing hydrogen gas according to the invention;
optionally, separating the hydrogen gas from carbon dioxide;
directing the hydrogen gas to a process and/or device capable of producing energy by using hydrogen gas; and,
producing energy by using the hydrogen gas.

In a further aspect, the present invention relates to a method of producing a gas comprising hydrogen gas and being free of carbon monoxide (CO), wherein the chemical reaction is conducted at a temperature in the range of 15-220° C.

In another aspect, the present invention provides a method for providing hydrogen gas as a reagent in a specific chemical reaction, for example chemical synthesis, the method comprising the step of producing hydrogen gas according to the present invention, optionally, removing $CO_2$ from the gas obtained, and directing the hydrogen gas to provide it for the specific chemical reaction.

The reaction preferably takes place in an aqueous solution and at relatively low temperatures. The chemical reaction of the method of the present invention is believed to be highly advantageous because, first, the reaction products, $H_2$ and $CO_2$, can be easily separated from the reaction medium and from each other. Actually, the gas just separates from the reaction medium when being generated. Second, the catalyst is easily separated from the reaction products, due to the high solubility of the catalyst in the reaction medium and practically zero solubility in the reaction products. The combination of these features render the method of the present invention an extremely valuable tool for producing hydrogen gas for any purpose one can envisage.

DETAILED DESCRIPTION OF THE PREFERRED EMBODIMENTS

Figure 1A:
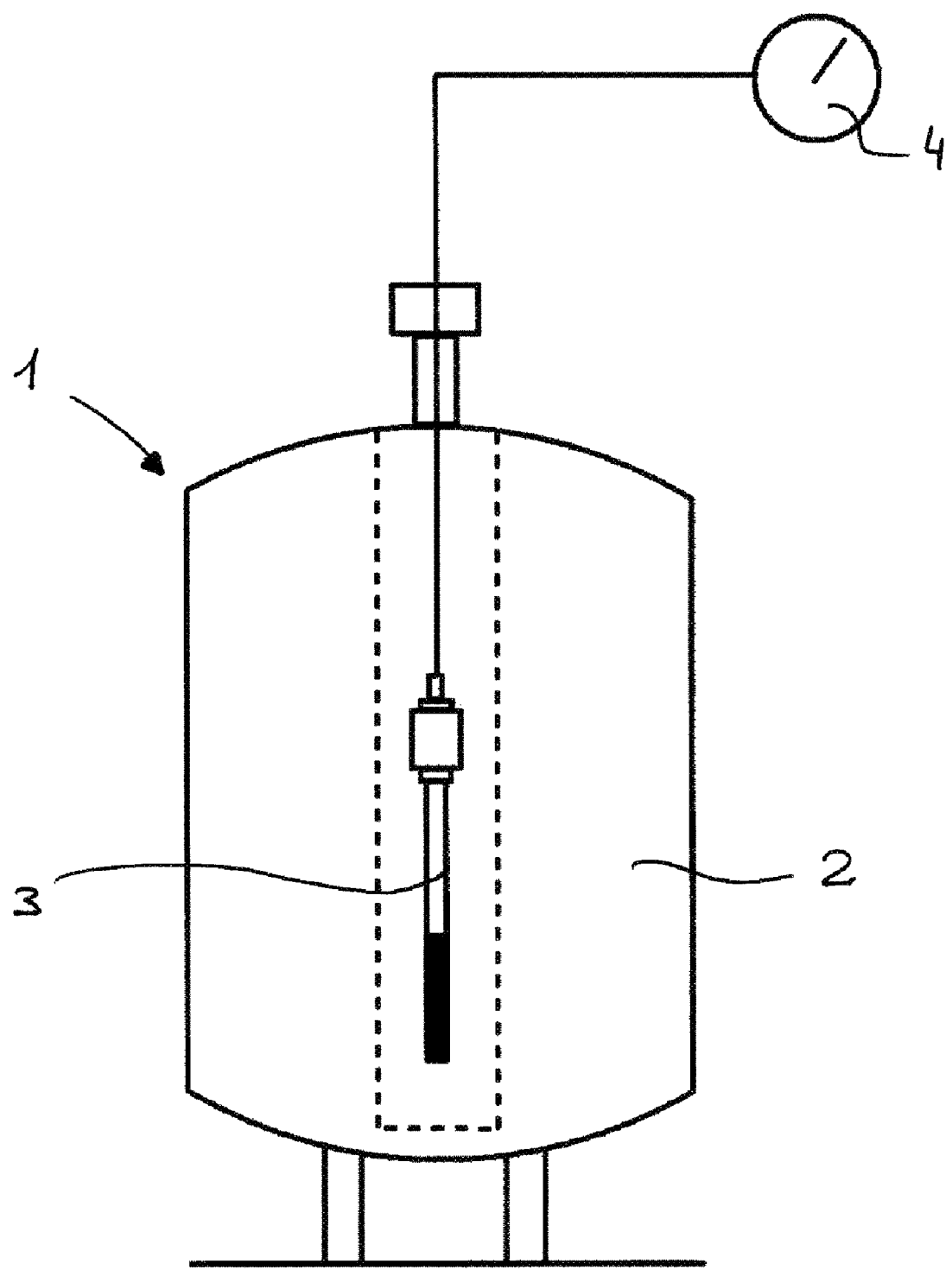
FIG. 1A schematically shows a device in which the reaction of the present invention can be conducted while simultaneously observing starting materials and reaction products by NMR and by gas pressure measurements in the same time.

The present invention provides a way to generate hydrogen gas devoid of carbon monoxide not only at a unusually high rate, but also at a rate that can be controlled easily by supply of formic acid, and/or varying temperature in the reaction vessel, and/or by varying other parameters of the reaction.

The reaction is robust, as the catalyst is completely recycled and is effective for prolonged time without degradation. The catalyst preferably used in the method of the present invention is stable at the temperatures and in the acidic environment of the reaction.

The reaction conditions are generally mild, as the reaction was observed to take place at high conversion efficiency already at temperatures of around 20° C., for example RT (25° C.) and higher.

The reaction vessel in which the reaction takes place needs to be substantially impermeably to water and air and preferably withstand the acidic reaction conditions as defined further below. Accordingly, glassware may constitute a material for a reaction vessel in which the reaction of the method of the present invention can be conducted.

If the reaction is conducted at high pressures, the reaction vessel needs, of course, to be adapted to the pressures and further conditions generated by the chemical reaction. Accordingly, depending on the amount of pressure to be generated, vessels of different materials and sizes may be constructed. At very high pressures such as those described below, reactors made of hydrogen resisting stainless steel may be used (Hastelloy, Inconel, etc).

Preferably, the reaction vessel comprises a formic acid inlet and/or a gas outlet. The gas outlet may be provided as a valve, thus allowing to control the pressure inside the reaction vessel may be controlled by the valve properties. In case that the reaction is conducted at above ambient pressures in the reaction vessel, the formic acid inlet is preferably coupled to a pump so that formic acid can be entered into the aqueous solution in the reaction vessel albeit the high pressures inside it.

The reaction vessel preferably comprises means for measuring the temperature and pressure inside the vessel, in particular a thermometer and a pressure gage.

The chemical reaction of the present invention preferably takes place in an aqueous solution, with water providing the principle, preferably the only solvent (reaction medium). Preferably the aqueous solution is a ionic aqueous solution. For the reaction of the present invention to be carried out, only the starting material, formic acid, and the catalyst are required. Preferably, also a formate salt is present in the aqueous solution.

Accordingly, in the method of the present invention, preferably a catalyst is used. In other words, the chemical reaction of the method of the present invention is a catalytic reaction.

The catalyst to be used in the reaction of the present invention is preferably soluble in water at least 50 g/L water at 25° C. More preferably it is soluble at least 100 g/L water, even more preferably at 150 g L/water and most preferably at least 200 g L/water.

Of course, catalysts having lower solubilities could do as well, for example with catalysts having higher efficiencies than those reported herein.

Importantly, the catalyst is much more soluble in the reaction medium, generally water, than in any of the products produced, in particular in supercritical $CO_2$, if the reaction is conducted at a pressure sufficiently high for $CO_2$ to be present in the supercritical state. For example, above 31° C. and 73 bar partial pressure, $CO_2$ is present as a supercritical $CO_2$. Since the method of the present invention can be conveniently be conducted under these conditions, the catalyst preferably is practically insoluble in supercritical $CO_2$, the latter serving as solvent in many chemical reactions.

Preferably, the molecular ratio of solubility of the catalyst in water to the solubility of the catalyst in supercritical $CO_2$ is >99.5:0.5, more preferably >99.99:0.01, most preferably >99.999:0.001.

Furthermore, the catalyst is stable at temperatures $\geq 60°$ C., preferably $\geq 80°$ C., preferably $\geq 120°$ C., more preferably $\geq 150°$ C. and most preferably $\geq 180°$ C. Stable, for the purpose of the present invention, means that the catalyst catalyses at least 5, preferably 10 or more reaction cycles without measurable degradation or measurable loss of activity.

Preferably, the catalyst is stable at the pH at which the reaction is conducted, as defined further below.

Preferably, the catalyst is the catalyst of formula (I), $M(L)_n$ as defined above. Preferably, M is Ru or Rh, more preferably Ru (Ruthenium). Ru preferably is in the oxidation state $Ru^{II}$ during the reaction, however, $Ru^{III}$, which is more easily available may also be used. It was observed that $Ru^{III}$ is converted to $Ru^{II}$ during the reaction.

According to an embodiment of the method of the invention, if n>1, each L may be different from another L.

L, in formula (I), is preferably selected from aryl phosphines, more preferably phenyl phosphines, for example triarylphosphines and/or triphenylphosphines. Preferably, the aryl phosphine is substituted in order to increase its solubility in water. Preferably, the aryl phosphine is substituted by a hydrophilic group. The hydrophilic group is preferably selected from sulphonate, carboxylate, and/or hydroxy, for example. Preferably it is sulphonate.

Preferably, L in formula (I) above is a sulfonated triaryl phosphine. It may be a mono-, di- or trisulphonated aryl phosphine. Preferably, the triarylphosphine is trisulfonated.

Preferably, L is a sulfonated triphenylphosphine. It may be a mono-, di- and/or trisulphonated triphenylphosphine. Preferably, the triphenylphosphine is trisulfonated, as in this case solubility in water is highest.

The sulfonyl group may be in the meta or para position of the aryl/phenyl group bound to the phosphorus atom. Sulphonated triphenylphosphines with the sulfonate group present at the meta position are more easy to synthesise and are, therefore, preferably used in the method of the present invention.

Preferably, L is TPPTS (tris(3-sulfophenyl)phosphine).

L can be also a carbene.

In formula (I) above, n is preferably 1, 2, 3 or 4, more preferably it is 1, 2 or 3, most preferably it is 2. If n is $\geq 2$, each ligand $L_{(1\ to\ n)}$ may be the same or different. An unlimited number of combinations is technically possible in the context of the present invention. Care has to be taken that, when selecting ligands, the preferred water solubility of the ligand as defined herein is obtained.

For illustrating the many possibilities of selecting ligands for the catalyst of the present invention, one could imagine that n is 2, with ligand $L_1$ being a mono, bis, tris or non-sulfonated triphenyl phosphine and ligand $L_2$ being selected from a carbene, a carbonated triphenyl phosphine or from a (mono, bis or tris) sulphonated triphenyl phosphine, for example.

Preferably, if n=2, one ligand $L_1$ is selected from a mono, bis, or tris sulfonated triphenyl phosphine and ligand $L_2$ is selected from a carbene, a carbonated triphenyl phosphine or a sulphonated triphenyl phosphine (in particular a mono, bis, or tris sulfonated triphenyl phosphine).

Alternatively, if n=2, ligand $L_1$ is selected from a mono, bis, tris or non-sulfonated triphenyl phosphine and ligand $L_2$ is selected from a mono, bis, or tris sulfonated triphenyl phosphine).

For example, if n is 2, $L_1$ may be TPPTS and $L_2$ may be TPPMS (mono sulfonated triphenyl phosphine). According to another example, $L_1$ may be TPPTS and $L_2$ may be TTPDS (bis(3-sulfophenyl)phosphine). According to a still other example, a non-sulfonated triphenyl phosphine ligand may be combined with a trisulphonated triphenyl phosphine ligand. Basically, all combinations of mono, bis, tris and non-sulfonated triphenylphosphine ligands are possible.

If $n \geq 2$, there is preferably at least one sulfonated triphenylphosphine ligand present. However, it is also possible to use and combine triphenylphosphine ligands comprising carboxylate groups.

It is worthwhile noting that, in general, catalysts with twice the same ligand L, e.g. TPPTS, are much easier to prepare than catalysts with different ligands L.

According to a preferred embodiment, the catalyst is [Ru(TPPTS)$_2$(H$_2$O)$_4$]X$_Y$, in which X is a non coordinating anion, for example tosylate, triflate, and Y is 1 or 2, the overall charge of X$_Y$ being –2.

The catalyst may be conveniently synthesised by mixing constituents (Ru$^{II}$ and/or Ru$^{III}$, TPPTS, for example) of the complex in water in the respective molecular quantity followed by crystallisation. The individual constituents are commercially available and are described in the literature. Alternatively, the catalyst can be synthesised and partly generated in situ, in the aqueous solution providing the reaction mixture by adding said constituents first to an aqueous solution.

The reaction of the method of the present invention is preferably conducted in presence of a formate salt. Surprisingly, the presence of the formate salt can have a positive impact on the rate of the reaction. On the other hand, with the ratio of formic acid (HCOOH) to formate (HCOO$^-$) in the aqueous solution decreasing, conversion efficiency decreases, in other words, the percentage of formic acid that is converted becomes lower.

The formate salt may be any formic salt as long as the cation does not substantially interfere with the chemical reaction. Preferably, the cation is an inorganic cation, for example calcium sodium preferably a metal ion. For example, the cation is sodium and/or potassium, also possible are lithium, cesium, calcium and ammonium. The use of different formate salts (with different cations, for example) is not excluded.

Therefore, the molecular ratio of HCOOH:HCOO$^-$ can be adjusted according to preferences on rate or conversion efficiency, as is desired by the skilled person. The present inventors found an optimum ratio in the range of 1:20 to 30:1, preferably 1:5 to 20:1, more preferably 1:1 to 15:1, and even more preferably 5:1 to 14:1. The most preferred ratio for having an optimal compromise between reaction rate and conversion efficiency was found to be 9:1. According to a preferred embodiment, the molecular ratio of HCOOH:HCOO$^-$ is in the range of 1:9 to 15:1. The ratio of HCOOH:HCOO$^-$ is a way of controlling the rate and conversion efficiency of the present invention (see examples) and can be adjusted according to the preferences of the skilled person.

For the purpose of the present specification, values indicating the end-points of a range are considered to be included in the range.

The presence of formic acid and the formate having, of course, an influence on the pH, the reaction of the present invention is preferably conducted at a pH in the range of 0-6, more preferably 1-5, even more preferably 1.5-4.5 and most preferably 2-4 and 2-3.5. According to preferred embodiments, the pH is in the range of 1-6, preferably 2.5-5.0.

The temperature of the reaction mixture (aqueous solution) was found affect reaction rate. Accordingly, the chemical reaction of the method of the present invention is preferably conducted at a temperature in the range of 20° C.-200° C., preferably 60° C.-150° C., more preferably 70° C.-140° C., even more preferably 80° C.-130° C., most preferably 90° C.-125° C.

The temperature is preferably applied from outside the reaction vessel by suitable heating/cooling equipment. For example, heat exchangers, electric heating, an oil bath and or water bath may be used to control the temperature in the interior of the reactor.

Other preferred ranges for the reaction of the method of the invention are 25° C.-200° C., 80° C.-110° C.; 90° C.-120° C. and 80° C.-130° C.

It is clear that the reaction temperatures can be controlled according to the preferences. If $H_2$ production is to be very cost-effective, it may be conducted at ambient temperatures for prolonged time. This may be the case if cost is a more important factor than time, for example when hydrogen is consumed in a low rate. Under these conditions, temperature ranges of 20-90° C., 25-70° C. may be selected, or even lower temperatures, for producing hydrogen and $CO_2$ gas at a relatively slow rate but still pressures significantly above 1 bar.

In principle, the higher the temperature, the quicker the reaction takes place. However, very high rates are obtained at relatively low temperatures and therefore, temperatures around 100° C.±20° C., preferably ±15° C. are preferred for practical reasons.

A further way of controlling the reaction rate is, of course, the supply of formic acid to the reaction vessel. The chemical reaction of the method of the present invention can be conducted batch-wise or continuously. In the batch-wise operation mode, the amount of formic acid added per batch determines the amount of hydrogen gas being produced. In the continuous mode, the rate of adding formic acid into the reaction vessel can be used to determine rate and/or amount of hydrogen being produced.

Temperature is thus one of the ways among others of controlling the reaction of the method of the present invention. By keeping the reaction vessel at a specific temperature, or by modifying this temperature, the reaction rate can conveniently be controlled.

Accordingly, in an embodiment, in the method of the present invention, the hydrogen quantity and/or gas pressure is controlled, optionally in the course of the reaction taking place, by varying one, several, or all of factors selected from:
  pH;
  the molecular ratio of formic acid to formate in the reaction medium;
  the reaction temperature;
  supply of formic acid;
these factors being varied, if applicable, according to the ranges provided in the present description.

The hydrogen and carbon dioxide gas developed in the course of the reaction can cause considerable pressure. Surprisingly, the equilibrium of the reaction of the present invention lies so far at the side of the products, that the increasing pressure does not stop the reaction. So far, total gas pressures of up to 1200 bar have been measured, which means that the method of the present invention can be conducted under or at these pressures.

In terms of $H_2$ partial pressure, the reaction was conducted to produce $H_2$ at partial pressures over to 600 bar. It is expected that $H_2$ higher partial pressure can be obtained, for example up to 1000 bar and more, in suitable reaction vessels. Accordingly, the reaction of the present invention is preferably conducted at a $H_2$ partial pressure in the range of 0.5-600 bar.

A pure $H_2$ and $CO_2$ mixture (50:50 vol. %) is produced.

The method of the present invention can be controlled to produce from 0-90 liter $H_2$/minute/liter reactor volume. For example, the method produces from 10-60, 20-60, 30-55, or 40-55 liter $H_2$/minute/liter reactor volume, according to the preference of the skilled person. In particular, the tuned reaction produces 80 liter $H_2$/minute/liter reactor volume. Any value in the ranges may be obtained by adjusting parameters, for example the temperature, catalyst concentration, formate concentration, the formic acid supply rate, accordingly.

If required, $CO_2$ can easily be separated from $H_2$, by exploiting physical properties such as melting temperature, volatility and/or diffusion coefficient that differ with the two gases.

The absence of any carbon monoxide in the produced gas, the high rate and efficiency of conversion of formic acid to $H_2$ under the conditions described hereinabove, as well as the fact that the reaction can be conveniently controlled provide important advantages, for example if combined with the requirements of a fuel cell. The fact that $H_2$ at a high partial pressure is produced is also an advantage, because it permits to control the amount of $H_2$ conducted to a hydrogen gas consuming device, such as a fuel cell by modifying the valve properties, with the reaction vessel functioning as a reservoir for $H_2$. The reaction vessel thus has two functions: hydrogen gas is produced in it in accordance with requirements, and hydrogen gas pressure is buffered in it under high pressure and thus constitutes a buffer tank. Of course, if compared to a traditional tank of hydrogen gas stored under pressure, a significantly smaller and lighter vessel size can be used, with the actual tank of fuel being constituted by a container of formic acid, which may be used to produce hydrogen gas to meet short term requirements.

The present invention provides a method and/or device for producing energy. The energy may be energy in any form, such as kinetic energy, electric energy, heat, potential energy, or combination of these at the same time.

For example, devices producing energy from hydrogen gas are motors, such as a combustion motors and hydrogen fuel cells. Methods for producing energy from hydrogen gas are the methods taking place in the motor or the fuel cell. A fuel cell, for example, may produce electric energy. A motor may produce kinetic energy and/or heat, for example.

The present invention also provides a method for producing hydrogen gas ($H_2$.) for chemical uses, that is, for using it in a chemical reaction, in particular chemical synthesis. In this case, the hydrogen gas may be produced according to the requirements in the chemical reaction and be directly directed in the necessary quantity to the place where the reaction/synthesis is supposed to happen.

The present invention also provides a process and/or apparatus consuming energy, whereby the energy is produced by the method and/or device of the present invention. Apparatuses consuming energy are, for example, vehicles, such as cars, trains, aircrafts or boats. Of course, any energy consuming apparatus is referred to, not only transport vessels. Accordingly, the energy consuming apparatus is understood to also refer to plants, households, and so forth.

Preferably, with respect to the method and/or device producing energy from hydrogen gas, said hydrogen gas is preferably produced in, or in close vicinity to said device for the purpose of producing energy. "Vicinity", in the context of the present invention, refers to the fact that the hydrogen gas may be directly guided to the method and/or device without need to be stored in a storage container, such as a gas bottle, which has to be brought to the device and which needs to be exchanged as soon as it is empty. In other words, "vicinity" refers to a system in which hydrogen gas is produced from a formic acid storage, in a way that hydrogen gas can be produced continuously or batch-wise as long as formic acid is present for providing hydrogen gas to the energy producing method and/or device.

Figure 5:
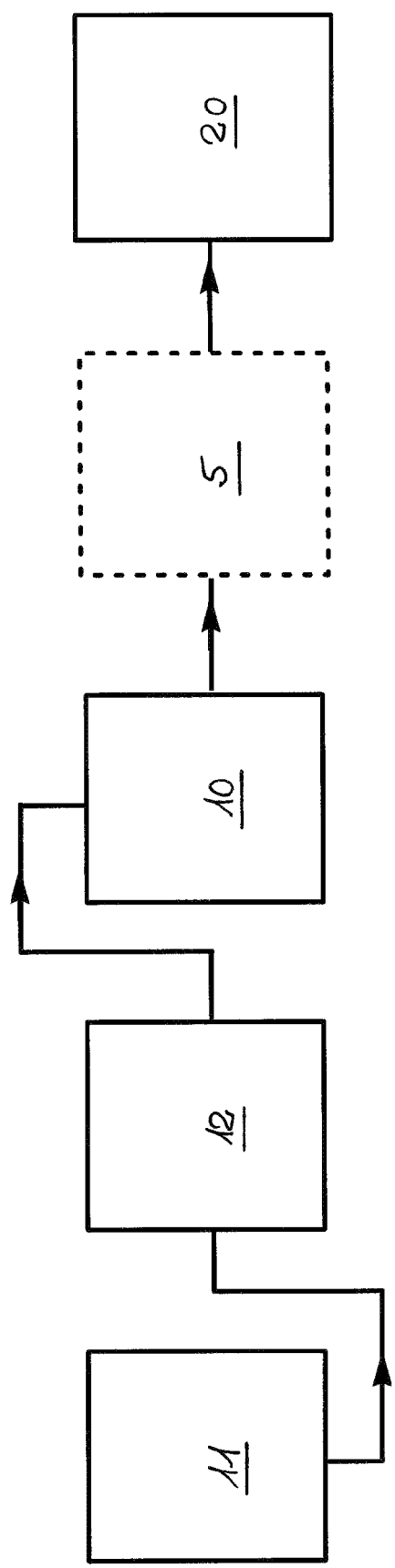
FIG. 5 schematically shows a device of the present invention: the formic acid tank, the reactor, and the utilisation (fuel cell, motor a vehicle, heating, chemical utilisation, etc).

FIG. 5 schematically illustrates a device and/or method producing energy. In this figure, 11 illustrates a HCOOH reservoir, which is connected to a pump 12, which pumps formic acid into reactor 10, from which hydrogen gas is directed to the desired application 20, which may be a motor, a fuel cell, a reactor for a further chemical reaction, for example. An optional $CO_2$-separator 5 is indicated with doted lines, and may be used whenever pure hydrogen gas or hydrogen gas free of $CO_2$ is required for application 20.

For example, the energy may be electric energy produced by a fuel cell, the method comprising the steps of:
producing hydrogen gas according to the method of the present invention;
optionally, separating the hydrogen gas from the carbon dioxide;
directing the hydrogen gas to a fuel cell; and,
oxidizing the hydrogen gas with oxygen gas in said fuel cell and thus creating electric energy.

In general, the process and/or apparatus consuming energy is preferably situated in vicinity to the method and/or device producing energy, for example on the vehicle, if the energy consuming apparatus is a vehicle. The energy may, of course, be stored in a suitable form, if desired, before being consumed by the method and/or apparatus consuming energy. Preferably, however, the energy is produced, by the method of the present invention, according to the energy requirements of the process and/or apparatus, and hydrogen gas is produced and guided to the energy producing method and/or device for producing energy as a function of said energy requirement.

The present invention is described more concretely with reference to the following examples, which, however, are not intended to restrict the scope of the invention.

EXAMPLES

Example 1

Preparation of Catalyst [Ru(TPPTS)$_2$(H$_2$O)$_4$](tos)$_2$]

The catalyst precursor [Ru(TPPTS)$_2$(H$_2$O)$_4$](tos)$_2$], was prepared by dissolving [Ru(H$_2$O)$_6$](tos)$_2$, in which tos=tosylate (4-methylbenzenesulfonate ion) and TPPTS, where TPPTS is tris(3-sulfophenyl)phosphine tri sodium salt, in a molar ratio of 1:2 in water, slightly acidified with tosylic acid.

[Ru(H$_2$O)$_6$](tos)$_2$ is synthesised according to the method of Bernhardt (Bernhardt, P.; Biner, M.; Ludi, A. *Polyhedron* 1990, 9, 1095-1097). TPPTS is commercially obtained from Aldrich (N° 444979) CAS 63995-70-0.

2.1 g (0.0038 mol) [Ru(H$_2$O)$_6$](tos)$_2$ was mixed with 4.3 g (0.0076 mol) TPPTS in 20 mL water (containing 0.2 g tosylic acid) at 55° C. until the complex formation was complete (NMR check, J. Kovács, F. Joó, A. C. Bényei, G. Laurenczy, *Dalton Transac.*, 2004, 2336), after the water was evaporated in vacuum.

Example 2

Experimental Setting for the Preparation of Hydrogen from Formic Acid

Figure 1B:
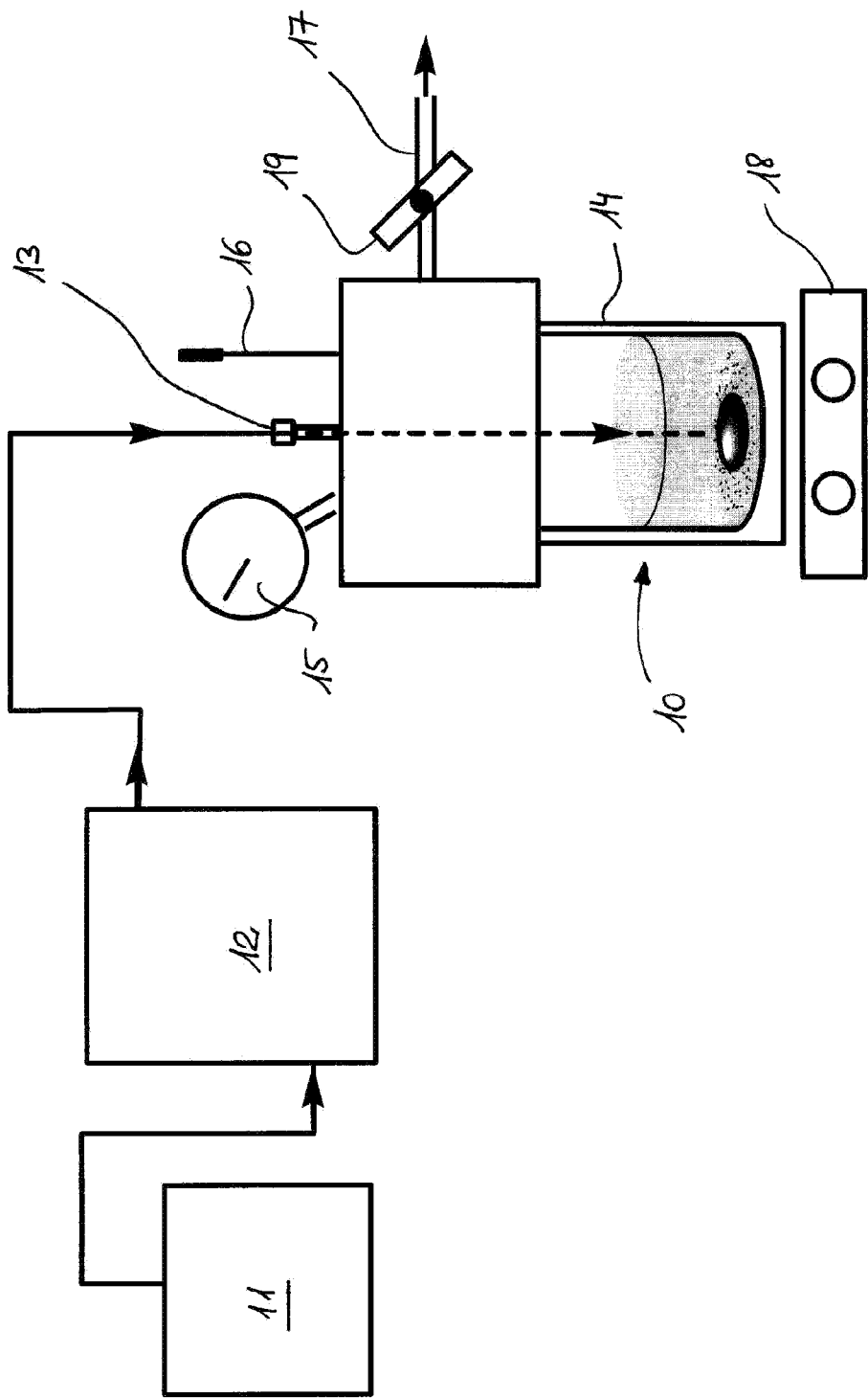
FIG. 1B schematically shows the reactor in which the reaction of the present invention can be conducted.

The reaction was carried out in two different reactors:
A) In high pressure sapphire NMR tubes (A. Cusanelli, U. Frey, D. T. Richens, A. E. Merbach, *J. Am. Chem. Soc.*, 1996, 118, 5265) equipped with a manometer, in batch mode. The reaction was followed simultaneously by multinuclear NMR ($^1$H, $^{13}$C, $^{31}$P) and in the same time by the pressure evolution of the $H_2$ and $CO_2$. This setting 1 is schematically illustrated in FIG. 1A, in which the NMR tube 3, serving as a reaction vessel, comprising the reactants is placed in the NMR spectrometer 2 and wherein a pressure measurement device 4 placed on top of the tube, can be monitored from outside.
B) In a high pressure autoclave of the type Parr 47, equipped with manometer, thermometer, modified for inlet/outlet, connected to a HPLC pump for supplying formic acid with the required pressure. It was used both in batch mode and in continuous mode. The reactor was prepared according to the schematic illustration shown in FIG. 1B, in which 10 stands for the reaction vessel/reactor. A formic acid reservoir 11 is connected to a pump 12, which pumps the formic acid through an inlet 13 directly into a glass container placed in the autoclave 14. The autoclave is equipped with a manometer 15 and a thermometer 16 that permit monitoring of the conditions inside the reactor while the reaction takes place. A gas outlet 17 comprises a valve 19 in order to control the gas outflow. A heater 18 is provided for controlling the temperature in the reactor, where the reaction takes place.

In a standard experimental setting, in high pressure sapphire NMR tube reactors, 2.5 mL of an aqueous solution of 4 M HCOOH/HCOONa, with a initial molar formic acid to formate ratio of 9:1 (that is 3.6 M HCOOH and 0.4 M HCOONa) is prepared at RT (=25° C.) in a 10 mm sapphire NMR tube. The pH of the solution was about 2.8.

The catalyst is formed in situ by adding [Ru(H$_2$O)$_6$](tos)$_2$ (30 mg, 0.054 mmol) and TPPTS at (61 mg, 0.108 mmol) to the aqueous solution (catalyst concentration: 0.022 mM).

Oxygen is removed previously from all solutions by bubbling N$_2$ into the solution, since both, [Ru(H$_2$O)$_6$](tos)$_2$ and the phosphines can be oxidized.

The sapphire tube is put into the NMR spectrometer, connected to a manometer and the reaction is started by heating to a temperature of 90° C.

Reactions are followed by analysing the species in solution by multinuclear ($^1$H, $^{13}$C, $^{31}$P) NMR spectroscopy. In general, the pressure in the sapphire NMR tube and the species in solution in each of the experiments were measured simultaneously as a function of time. There is no other product detected during the reaction beside H$_2$ and CO$_2$. As expected, it was found that pressure correlates directly with conversion.

There are no traces of CO is found in the reaction product gas as it is tested by $^{13}$C NMR and FT-IR spectroscopy.

In the batch-wise mode, for recycling, as one reaction cycle is completed (checked by NMR and no further increase in pressure—or release of gas through the outlet valve), the sapphire tube is moved out from the NMR spectrometer, opened and formic acid is added to restore the initial concentration of HCOOH.

In the continuous mode, the autoclave containing of an initial concentration of 4 M HCOOH/HCOONa (9:1), and 0.022 M [Ru(TPPTS)$_2$(H$_2$O)$_6$](tos)$_2$ in 12 mL water, is put in an oil bath and the reaction is started by heating the oil bath and therewith the temperature in the autoclave to a temperature of 100° C.

In the continuous mode, when the initial amount of formic acid is fully converted (no more increase in pressure), formic acid is added continuously at a constant rate of 0.1 mL/min. Non-degassed HCOOH is added without protection against oxygen. No effect on the activity is observed, indicating that the catalytically active species are not sensitive to oxygen. The H$_2$ (+CO$_2$) gas is released at 130 bar at a rate of about 150 mL/min in order to maintain the pressure constant. When addition is stopped and the gas out valve closed, no pressure increase is observed, which means that all formic acid has been converted. The continuous process was run for several weeks without any loss of activity, even if the process is interrupted and restarted.

In the following examples, batch-wise or continuous mode was selected for studying the effects of varying different reaction parameters provided in Example 2.

Example 3

Effect of Temperature on Hydrogen Production from Formic Acid

The experimental setting of Example 2 is modified to evaluate the effect of temperature on the pressure in the sapphire tube reactor.

Accordingly, 1.25 mL H$_2$O and 1.25 mL D$_2$O were supplied with 2 mM of the catalyst concentration obtained in Example 1. Formic acid and formate were initially added at a molar ratio of 9:1 and at a total concentration of 4 M. The pH of the solution was about 2.8.

The reaction was operated batch-wise, by closing the gas-outlet. Cycles 3-6 were conducted at different temperatures and the conversion over time was monitored. Accordingly, the $3^{rd}$ cycle was conducted at 90° C., the $4^{th}$ cycle was conducted at 100° C., the $5^{th}$ cycle was conducted at 80° C. and the $6^{th}$ cycle at 70° C.

Each cycle was considered terminated when conversion was more than 90% and no further increase in pressure was observed and no more change in the HCOOH/HCOONa concentration was detected by NMR. Then, for the next cycle, the pressure was released, new formic acid was added to restore the initial concentration of 4 M HCOOH/HCOONa and the reaction started by setting temperature.

At all temperatures, total pressure (and accordingly, conversion) increased with time, the HCOOH concentration decreased, with the reaction performed at 100° C. being completed fastest, after 30-40 minutes, when a pressure of about 120 bars was observed.

Figure 2:
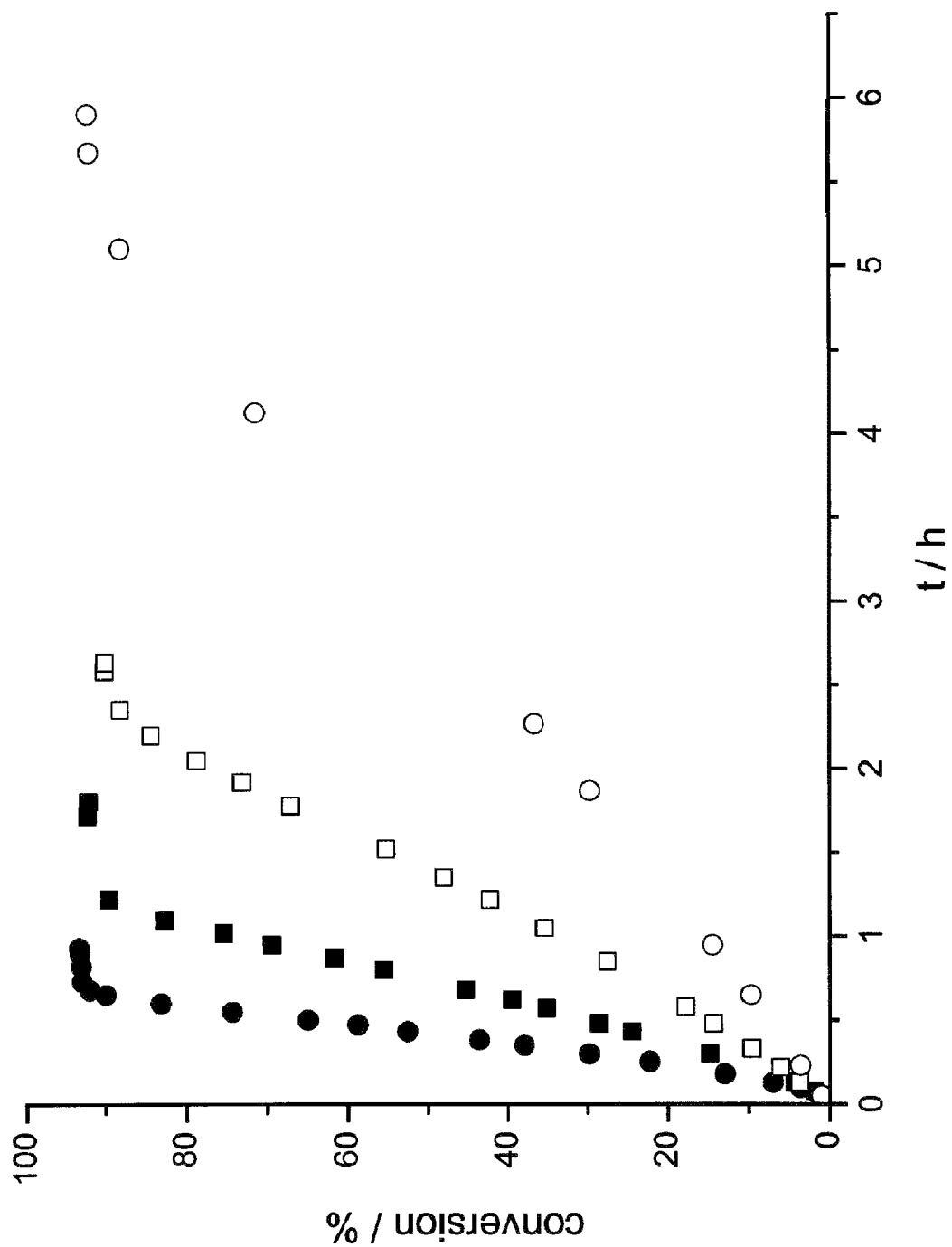
FIG. 2 shows the influence of temperature on the rate and conversion of the reaction of the present invention over time. Different symbols stand for experiments conducted at different temperatures: 100° C. (●); 90° C. (■); 80° C. (□); and 70° C. (○).

The results of this example are shown in FIG. 2, which shows the influence of temperature during different cycles on reaction rate. It can be seen that the reaction is completed most rapidly at 100° C. (●), whereby at 70° C. (○), the reaction is slowest, but still above 90% conversion is obtained. The reaction rate thus directly correlates with temperature.

Example 4

Effect of pH on Hydrogen Production from Formic Acid

Example 4.1

Ratio of HCOOH:HCOONa

Influence of pH to the reaction rate and conversion efficiency is measured with the experimental setting of Example 2, which is operated batch-wise and in which the initial ratio of HCOOH to HCOONa is varied, while keeping the overall concentration of substrate at 4 M, thus varying pH. Accordingly, HCOOH:HCOONa mixtures of 100:0 mol %, 90:10 mol %, 70:30 mol %, 40:60 mol %, 10:90 mol % and 0:100 mol % were prepared and added to the aqueous solution at 4 M.

After each completed reaction cycle, HCOOH was added to obtain a total concentration of 4 M, thus restoring HCOOH that was used up.

It was found that when only HCOOH or only HCOONa was used (100:0; 0:100), reactions were very slow.

It was found that the presence of HCOONa positively affects the reaction rate in a wide concentration range, with the conversion efficiency becoming lower at lower concentrations of HCOOH.

The optimum ratio of HCOOH:HCOONa in terms of reaction rate and conversion efficiency was identified to be around 9:1.

At this ratio, the pH was in the range of 2.6-3.1

Example 4.2

Effect of HCOONa Concentration on Conversion Efficiency and Reaction Rate

Example 4.1 is conducted batch-wise with a concentration of 22 mM [Ru(H$_2$O$_6$)](tos)$_2$, 44 mM TPPTS (catalyst formed in situ), 4 M HCOOH (10 mmol) with variable initial contents of HCOONa.

The experiment was repeated with 0.4, 1.2, 1.6, 3.6 M HCOONa and conversion was monitored over time.

After each reaction cycle, initial HCOOH concentration was restored to 4 M HCOOH.

Figure 3:
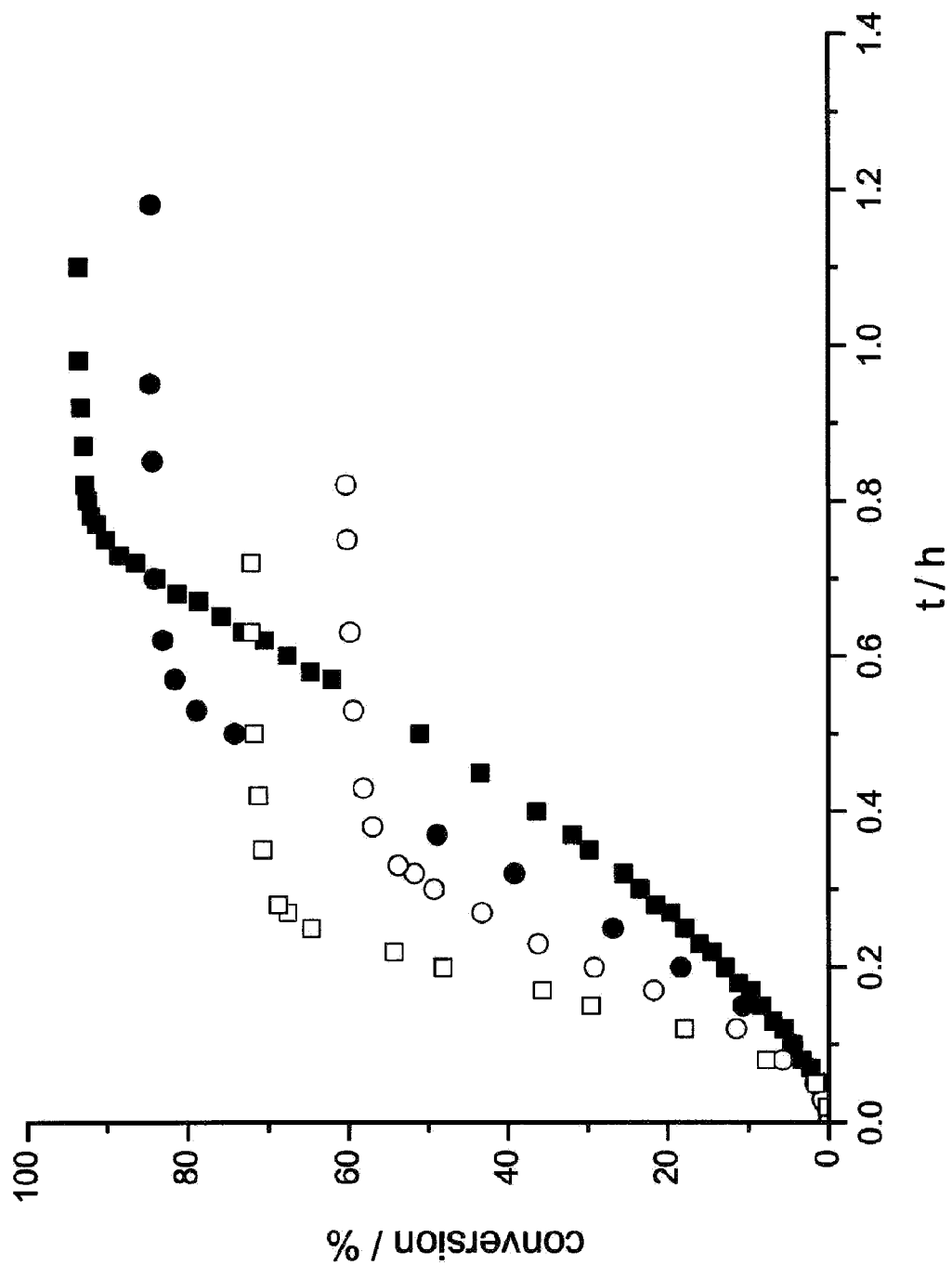
FIG. 3 shows the influence of HCOONa concentration on the rate and conversion of the reaction of the present invention over time. Different symbols stand for experiments conducted at different molar concentrations of HCOONa: 3.6 M (○); 1.2 M (●); 2.8 M (□); and 0.4 M (■).

The result is shown in FIG. 3, were it can be seen that with lowest initial HCOONa concentration (0.4 M, ■), the reaction advances slowest, but conversion of HCOOH to H$_2$ and CO$_2$ gets close to 100%. The reaction rate is higher at HCOONa concentrations of 1.6 (●), 2.8 (□) and 3.6 M (○), but overall conversion decreases. In summary, HCOONa concentration is inversely proportional with conversion. It increases the reaction rate, but only up to 2.8 M concentration. An optimum concentration of formate salt can be selected according to preferences of the skilled person.

Example 5

Effect of Catalyst on the Reaction

Example 5.1

Effect of Catalyst Concentration on Conversion Efficiency and Reaction Rate The experiment of Example 2, is modified by adding different initial concentrations (2.3 mM, 22 mM, 45 nM, 67 nM, 90 mM, 112 mM and 123 mM) of [Ru(H$_2$O)$_6$](tos)$_2$ and 2 equivalents of TPPTS.

It was observed that increase in catalyst concentration accelerates the rate of the HCOOH decomposition reactions until a catalyst concentration of is about 90 mM reached.

Example 5.2

Different Sulfonated Phosphine Ligands Tested

TPPTS (tris(3-sulfophenyl)phosphine trisodium salt) has been chosen as ligand because of its very high water solubility and stability. The catalysis was further tested with less soluble mono-sulfonated triphenyl phosphines, with the sulfonyl group in para and meta position (pTPPMS and mTPPMS), as a ligand for the [Ru(H$_2$O)$_6$](tos)$_2$ complex. Two equivalents mTPPMS and pTPPMS, respectively were added to each Ru— equivalent.

The experiments were conducted in the batch-wise mode in the sapphire NMR-tube as indicated in Example 2.

Figure 4:
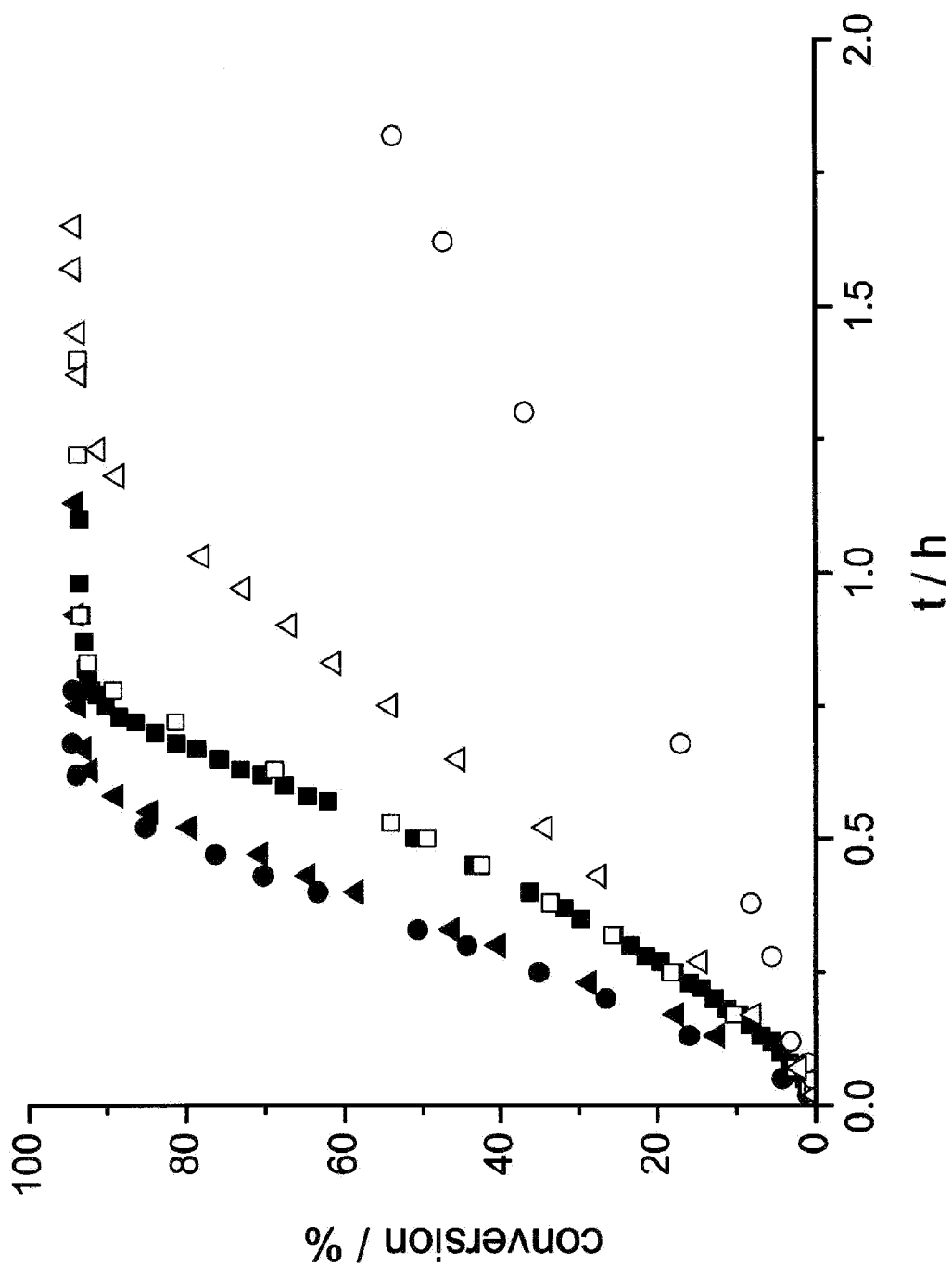
FIG. 4 shows the conversion of formic acid to hydrogen gas and carbon dioxide in a first reaction cycle in dependence of different ruthenium phosphine catalysts, co-catalyst systems: [Ru(H$_2$O)$_6$](tos)$_2$+2 mTPPTS (■), 2 mTPPMS (●), 2 pTPPMS (▲), RuCl$_3$+2 mTPPTS (□), mTPPMS (○), pTPPMS (Δ).

The results are shown in FIG. 4. As can be seen, the reaction works with all catalysts. The rate is slightly faster with monosulfonated triphenylphosphines (●, ▲) than with the trisulfonated one (■), but since the former are only partially soluble in water, handling is less convenient. When ruthenium is added as RuCl$_3$, the reactions are slower and the catalyst less stable over repeated cycles, specially with the monosulfonated triphenylphosphines (○, Δ).

Example 5.3

Ru$^{III}$ and Ru$^{II}$

[Ru$^{III}$(H$_2$O)$_6$](tos)$_3$ is tested with two equivalents of TPPTS according to the batch-wise operation mode set out in Example 2. In presence of two equivalents of TPPTS, the reaction is as fast as [Ru$^{II}$(H$_2$O)$_6$](tos)$_2$ with two TPPTS.

In the cycles following the first reaction cycle, no difference in reaction rate or conversion was found between [Ru$^{II}$(H$_2$O)$_6$](tos)$_2$ and [Ru$^{III}$(H$_2$O)$_6$](tos)$_3$. The species observed during the reaction with Ru$^{III}$ are similar to what is observed with Ru$^{II}$, indicating that the Ru$^{III}$ is reduced during the process.

Example 5.4

Further Ru Catalysts with or without TPPTS Ligands

Example 2 was conducted for one reaction cycle in the NMR-sapphire tube, whereby [Ru(TPPTS)$_2$(H$_2$O)$_4$](tos)$_2$ as prepared in Example 1 was used (5.4 $a$)) or replaced by another catalyst as listed below:
Experiment 5.4 $a$): Ru(TPPTS)$_2$
Experiment 5.4 $b$): Ru(TPPTS)
Experiment 5.4 $c$): Ru(TPPTS)$_2$+10 TPPTS
Experiment 5.4 $d$): Ru(H$_2$O)$_6$
Experiment 5.4 $e$): Ru(H$_2$O)$_6$+2 equivalents TPPTS All catalysts showed certain activity, but catalysts 5.4 $a$) and $e$) showed the fastest rate, already in the first reaction cycle.

Example 5.5

Further Catalysts

Example 2 was repeated in the batch-wise mode whereby the catalyst was replaced, at the same concentrations, by one of the catalysts listed below.
Experiment 5.5 $a$)
  Catalyst [Ru$^{II}$(H$_2$O)$_6$](tos)$_2$ in presence of one equivalent of the diphosphine 1,2-bis(di-4-sulfonatophenylphosphino) benzene tetrasodium salt, Strem Chemicals, 15-0155
Experiment 5.5 $b$):
  Catalyst [Ru$^{II}$(H$_2$O)$_6$](tos)$_2$ in presence of one equivalent of 2,2'-bipyridine (Merck).
Experiment 5.5 $c$):
  Catalyst of an arene derivative [Cl$_2$Ru(PPh$_3$)(1-(2-benzyl-ethyl)-3-methylimidazolium]Cl (ref: T. Geldbach, G. Laurenczy, R. Scopelliti, P. J. Dyson; *Organomet.*, 2006, 25, 733.).

Experiment 5.5 d):

Catalyst [RuCl$_2$(PTA)(9S3)], where 9S3=1,4,7-trithiacyclononane and PTA=1,3,5-triaza-7-phosphaadamantane (ref.: B. Serli, E. Zangrando, T. Gianferrara, C. Scolaro, P. J. Dyson, A. Bergamo, E. Alessio; *Eur. J. Inorg. Chem.*, 2005, 3423.).

Results:

In general, all catalysts 5.5 a)-d) were much slower than Ru(H$_2$O)$_6$ with two TPPTS.

With the bipyridine ligand (5.5 b)), there is decomposition of the catalyst, observable by the change of the red solution to black and also by the loss of activity during recycling.

The arene compound (5.5 c)), initially soluble in the reaction mixtures, precipitates out during the reaction.

Example 6

Susceptibility of Catalyst to Poisoning 6.1 Poisoning by Mercury

Example 2 was run in the batch-wise mode with 22 mM [Ru(TPPTS)$_2$(H$_2$O)$_4$](tos)$_2$.

After the 3$^{rd}$ recycling of [Ru(TPPTS)$_2$(H$_2$O)$_4$](tos)$_2$, mercury is added to the solution. The following recycling cycles are not affected by the presence of Hg, giving a strong evidence that the catalytic reaction is homogeneous.

6.2 Carbon Monoxide (CO)

Example 2 was run in the batch-wise mode with 22 mM [Ru(TPPTS)$_2$(H$_2$O)$_4$](tos)$_2$.

After the 16$^{th}$ recycling of the [Ru(H$_2$O)$_6$](tos)$_2$+2 TPPTS solution (without loss of activity), the reactor is pressurised with 50 bar of CO and mixed for 15 minutes. The gas is then released and the reaction restarted. The first two recyclings (the 17$^{th}$ and 18$^{th}$) are significantly slowed down but the catalyst is not completely poisoned. During further recycling cycles, the CO is being slowly eliminated and the original activity of the catalyst is almost fully recovered.

6.3 Oxygen

As mentioned in Example 2 above, oxygen is removed from all the solutions by bubbling N$_2$ into the solution before the filling of the reactor. These precautions are taken since both [Ru(H$_2$O)$_6$](tos)$_2$ and the phosphines can be oxidized. However, during the recycling cycles, non-degassed HCOOH is added without protection against oxygen. In case of Ru(TPPTS)$_2$ it is not necessary to degas.

6.4 Chloride

Example 2 was run in the batch-wise mode. Further to the two equivalents of TPPTS, two equivalents of NaCl were added. No effect on the rate of reaction were observed during recycling in presence of NaCl.

Example 7

Pressure in Reaction Vessel

In order to verify that the reaction can still be done at a higher pressures, a high pressure autoclave was prepared in similar conditions.

At optimum temperature, pH and with the catalyst of Example 2, in batch mode the total gas pressures of over 750 bar were registered, with hydrogen gas partial pressures up to 370 bar.

CONCLUSIONS

From the series of experiments conducted described herein above it can be concluded that the method of the invention permits the quick production of hydrogen gas very pure from carbon monoxide. The amount of hydrogen gas to be produced can be determined and varied at very short terms by substrate quantity, temperature and pH. The hydrogen generation is easily controllable and the catalyst is robust. The reaction can conveniently be conducted at batch-wise or continuous mode without catalyst loss.

The invention claimed is:

1. A method of producing hydrogen gas and carbon dioxide in a chemical reaction from formic acid, said reaction being conducted:

in an aqueous solution;
at a temperature in the range of 15-220° C.;
in the presence of added formate salt, and,
in the presence of a catalyst, said catalyst comprising a complex of the general formula (I):

$$M(L)_n \quad (I)$$

in which,

M is a metal selected from the group consisting of Ru, Rh, Ir, Pt, Pd, and Os;

n is in the range of 1-4;

L is a ligand comprising at least one phosphorus atom, said phosphorus atom being bound by a complex bond to said metal, the phosphorus ligand further comprising at least an aromatic group and a hydrophilic group, wherein, if n>1, each L may be different from another L; and wherein the complex of formula (I) optionally comprises other ligands and is provided in the form of a salt or is neutral.

2. The method of claim 1, wherein said reaction is conducted at a temperature in the range of 75-140° C.

3. The method of claim 1, wherein said catalyst is stable at temperatures of up to 140° C. and at a pH in the range of 1-8.

4. The method of claim 1, in which the molecular ratio of formic acid:formate (HCOOH:HCOO—) is in the range of 1:9 to 15:1.

5. The method of claim 1, in which the reaction is conducted in an aqueous solution at a pH in the range of 1-6.

6. The method of claim 1, which is conducted at a H$_2$ partial pressure in the range of 0.5-600 bar.

7. The method of claim 1, wherein the hydrophilic group of at least one of the ligands L of the catalyst is at least one member selected from the group consisting of sulphonate, carboxylate and hydroxy.

8. The method of claim 1, in which the chemical reaction is conducted in the presence of a catalyst comprising a mono-, di- and/or tri sulfonated triphenylphosphine or its water soluble salts.

9. The method of claim 1, in which M is Ruthenium.

10. The method of claim 1, wherein hydrogen gas and carbon dioxide are continuously produced in the catalized chemical reaction from formic acid (HCOOH), said reaction being conducted in a reaction vessel at a temperature in the range of 15-220° C., in the presence of added formate salt, and at a pressure of above 1 bar.

11. The method of claim 10, wherein, in said reaction vessel, the molecular ratio of formic acid:formate (HCOOH:HCOO—) is in the range of 1:20 to 30:1.

12. The method of claim 10, wherein the catalyst, which is stable at temperatures of 60° C. or higher and/or which is soluble in water at at least 50 g catalyst/L water at 25° C. is used.

13. The method of claim 10, which continuously produces 10-90 liters H$_2$ per minute and per liter of the reaction vessel volume (reactor volume).

14. The method of claim 10, wherein said chemical reaction does not produce any carbon monoxide (CO).

15. The method of claim 10, which is conducted at a pressure of 120 bars or higher.

16. The method of claim 1, wherein hydrogen gas and carbon dioxide are catalytically produced in the chemical reaction from formic acid (HCOOH), said reaction being conducted in a reaction vessel at a temperature in the range of 15-220° C., and wherein said chemical reaction does not produce any carbon monoxide (CO).

17. The method of claim 16, which is conducted in the presence of a formate salt and wherein, in said reaction vessel, the molecular ratio of formic acid:formate (HCOOH:HCOO—) is in the range of 1:20 to 30:1.

18. The method of claim 16, wherein said hydrogen gas is produced continuously and formic acid is continuously added to the reaction vessel.

19. A method of producing energy, the method comprising the steps of:
- producing hydrogen gas according to the method of any of claim 1, 10 or 16;
- directing the hydrogen gas to a process and/or device capable of producing energy by using hydrogen gas; and,
- producing energy by using the hydrogen gas.

* * * * *